United States Patent
Maw

(10) Patent No.: US 10,352,103 B2
(45) Date of Patent: Jul. 16, 2019

(54) CUTTER SUPPORT ELEMENT

(71) Applicant: Ulterra Drilling Technologies, L.P., Fort Worth, TX (US)

(72) Inventor: Jason Maw, Beaumont (CA)

(73) Assignee: Ulterra Drilling Technologies, L.P., Fort Worth, TX (US)

( * ) Notice: Subject to any disclaimer, the term of this patent is extended or adjusted under 35 U.S.C. 154(b) by 315 days.

(21) Appl. No.: 14/338,404

(22) Filed: Jul. 23, 2014

(65) Prior Publication Data
US 2015/0027788 A1 Jan. 29, 2015

Related U.S. Application Data

(60) Provisional application No. 61/858,574, filed on Jul. 25, 2013.

(51) Int. Cl.
| | | |
|---|---|---|
| *E21B 10/573* | (2006.01) | |
| *B22F 7/06* | (2006.01) | |
| *E21B 10/43* | (2006.01) | |
| *B23K 35/00* | (2006.01) | |
| *B23K 35/02* | (2006.01) | |

(52) U.S. Cl.
CPC .............. *E21B 10/43* (2013.01); *B22F 7/062* (2013.01); *B23K 35/00* (2013.01); *B23K 35/0211* (2013.01); *B23K 35/0222* (2013.01)

(58) Field of Classification Search
CPC ........ E21B 10/573; E21B 10/43; E21B 10/55; E21B 10/567; B22F 7/062
See application file for complete search history.

(56) References Cited

U.S. PATENT DOCUMENTS

| | | | | |
|---|---|---|---|---|
| 4,200,159 A | * | 4/1980 | Peschel | B22F 7/06 175/428 |
| 4,679,639 A | * | 7/1987 | Barr | E21B 10/567 175/432 |
| 4,705,122 A | * | 11/1987 | Wardley | E21B 10/567 175/430 |
| 4,714,120 A | | 12/1987 | King | |
| 4,877,096 A | * | 10/1989 | Tibbitts | E21B 10/62 175/432 |
| 5,213,171 A | | 5/1993 | Clench et al. | |
| 5,244,039 A | * | 9/1993 | Newton, Jr. | E21B 10/43 175/431 |

(Continued)

FOREIGN PATENT DOCUMENTS

| | | |
|---|---|---|
| EP | 0534370 | 3/1993 |
| RU | 2374420 | 12/2008 |
| WO | WO 2007/098159 | 8/2007 |

*Primary Examiner* — Daniel P Stephenson
(74) *Attorney, Agent, or Firm* — Kilpatrick Townsend & Stockton LLP

(57) ABSTRACT

Cutters mounted on bits for advancing boreholes are subject to extreme forces that can separate the cutter from the bit. A cutter backing element with a rearward extending lug and forward face can provide support to the cutter. The backing element is attached to the back face of the cutter and the lug of the backing element is received in a recess of the bit. The backing element can be brazed to the bit and the cutter. The lug is offset from a longitudinal axis of the backing element. Forces applied to the front of the cutter during drilling operations are transferred through the cutter to the backing element and to the bit through the offset lug.

26 Claims, 5 Drawing Sheets

(56) References Cited

U.S. PATENT DOCUMENTS

| | | | | |
|---|---|---|---|---|
| 5,285,859 | A | * | 2/1994 | Tibbitts .................... E21B 10/62 175/428 |
| 5,301,762 | A | * | 4/1994 | Besson ................. E21B 10/006 175/379 |
| 5,348,109 | A | * | 9/1994 | Griffin .................. E21B 10/573 175/428 |
| 5,431,239 | A | * | 7/1995 | Tibbitts ................. E21B 10/567 175/428 |
| 5,505,273 | A | | 4/1996 | Azar et al. |
| 5,678,645 | A | * | 10/1997 | Tibbitts ............... E21B 10/5673 175/426 |
| 5,947,216 | A | * | 9/1999 | Truax .................... E21B 10/573 175/432 |
| 6,302,224 | B1 | * | 10/2001 | Sherwood, Jr. ....... E21B 10/573 175/397 |
| 7,216,565 | B2 | | 5/2007 | Sherwood, Jr. et al. |
| 7,594,554 | B2 | * | 9/2009 | Schwefe ............... E21B 10/573 175/428 |
| 8,307,739 | B2 | * | 11/2012 | Stevens .................. E21B 10/43 175/432 |
| 9,303,460 | B2 | * | 4/2016 | Schwefe ................. E21B 10/50 |
| 2015/0027788 | A1 | * | 1/2015 | Maw ....................... B22F 7/062 175/432 |

\* cited by examiner

CUTTER SUPPORT ELEMENT

FIELD OF INVENTION

The present invention relates to bits used for creating boreholes in rock formation. More particularly, this invention relates to elements that support the cutters used in the bits.

BACKGROUND OF THE INVENTION

In a typical drilling operation, a drill bit is rotated while being advanced into a rock formation. There are several types of drill bits, including roller cone bits, hammer bits and drag bits. Drag bits typically include a body with a plurality of arms, or blades, extending from the body. The bit can be made of steel alloy, a tungsten matrix or other material. Steel bodied bits most often have hard metal applied typically to the top, front and back surfaces of the blades to improve the life of the body. Hard metal resists erosion and corrosion of the steel during the drilling operation. Each blade supports a plurality of cutting elements that contact, shear and/or crush the rock formation in the borehole as the bit rotates to advance the borehole. There are many kinds of bits and cutters with different features and cutter configurations.

FIG. 1 is a schematic representation of a drilling operation 2. In conventional drilling operations a drill bit 10 is mounted on the end of a drill string 6 comprising drill pipe and drill collars. The drill string may be several miles long and the bit is rotated in the bore either by a motor proximate to the bit or by rotating the drill string, or both simultaneously. A pump 8 circulates drilling fluid through the drill pipe and out of the drill bit flushing rock cuttings from the bit and transporting them back up the wellbore. The drill string comprises sections of pipe that are threaded together at their ends to create a pipe of sufficient length to reach the bottom of the wellbore.

Cutters mounted on the head of the bit can be made from any durable material but are conventionally formed from a tungsten carbide backing piece, or substrate, with a front facing table comprised of a diamond material. The tungsten carbide substrates are formed of cemented tungsten carbide comprised of tungsten carbide particles dispersed in a cobalt binder matrix. The diamond table, which engages the rock formation, typically comprises polycrystalline diamond ("PCD") directly bonded to the tungsten carbide substrate, but could be any hard material. The PCD table provides improved wear resistance, as compared to the softer, tougher tungsten carbide substrate that supports the diamond during drilling.

Cutters are received in recesses, or pockets, along the leading edges of the blades. The cutters positioned in the pockets are secured to the drill bit body typically by brazing. The bit and cutters are subjected to high contact stresses and high temperatures in the downhole environment that can result in severe wear to them both. The cutters are subject to fracture, spalling, chipping and erosion. The body is subject to erosion and corrosion, which increases the likelihood of separation of the cutter from the pocket as the material around the cutter is lost.

While drilling rock, the PCD cutter is subject to large forces. These forces are transferred to the bit body through the pocket formed in the bit body. Where the cutter is not fully supported at the rear face, the forces generated during drilling can be sufficient to pull the cutter out of the cutter pocket.

Pockets are configured to retain the cutters during operation. The pockets in the blades orient each cutter independently of neighboring cutters. Different portions of the drill bit have configurations and orientations that optimize the function of the cutters, allowing the cutters to fail the rock optimally for a particular application. Cutters in the center of the bit may be positioned with higher back rake; that is they are angled backward in relation to the rock. Because of this, the pockets completely envelop the back portion of the cutter. In another part of the bit the cutters may be positioned with less back rake and thus the back of the cutter is less recessed, or buried, in the bit body. Thus, the pockets are shallower.

PDC cutters can be configured in the bit body in pockets that have raised features at the rear of the cutter pocket to more fully support the rear face of the cutter (FIG. 4A). This is particularly common for cutters that have less back rake, as these cutters are less recessed in the bit body. The raised backing features extend above the generally smooth surface of the bit body, or blade top, and act to support and better retain the cutter. As an integral part of the body comprised of the body material, or often a combination of materials for a steel bodied bit with its steel body and erosion resistant hard metal, these extensions are limited in strength and durability. As a result, the backing can wear or erode away risking loss of the supported cutter. Moreover, worn backing portions can result in more time consuming and expensive rebuilds of the bit. In a steel bodied bit, the shape of the raised supporting features make them difficult to machine and in addition, the application of hard metal or hardfacing to increase durability tends to burn away the steel, which compromises the strength of the raised supporting element.

Bits can incorporate backing elements as separate components. Backing elements to support the cutter have been disclosed in U.S. Pat. Nos. 4,714,120 and 7,216,565. In both examples a backing element supports the back face of a cutter. In each case the backing element includes a support base that extends generally perpendicular to the central axis of the cutter and into the bit body. This creates a high stress concentration in the backing element as it transfers forces from the cutter to the bit. The cutter is subject to repeated cyclic impacts absorbed by the backing element which can generate fatigue failure at the stress concentration points. These failures are accelerated by the high operating temperatures of the bit.

Even when employing hardened materials, the service life of a bit and cutters may be limited to a few hundred feet of operation before the bit loses effectiveness and needs to be refurbished or replaced. In particular, as the bit drills, the drilling fluid with the entrained rock cuttings tends to wear away the body and the raised cutter supporting features, allowing the cutters to over-engage the rock since there is less body material available to limit the depth of cut or over-engagement. Hardfacing is often applied to the blades of the bit to increase service life.

It should be appreciated that increasing the service life of the bit and increasing the footage drilled without damage provides more efficient and profitable operation of the equipment. Accordingly, there is room in the art for improvements in the structure and construction of bits and retention of cutters in the bit.

Examples of bits and retention of cutters in bits are also disclosed in U.S. Pat. Nos. 5,431,239 and 6,302,224. The disclosures of these and U.S. Pat. Nos. 4,714,120 and 7,216,565 are incorporated by reference in their entirety for all purposes.

SUMMARY OF THE DISCLOSURE

The present invention generally pertains to drilling operations where a rotating bit with cutters operates to advance a borehole in the earth. The bit is attached to the end of a drill string and is rotated to fail the rock in the wellbore, with cuttings being flushed to the surface. Cutters in the bit contact the formation and fail it typically by shearing. Backing elements of the present invention provide support for the cutters to improve retention and increase the service life, including the repairability, of the bit.

In one aspect of the invention, a backing element includes a body with a forward face to contact the back face of the cutter and a rearward offset lug spaced behind the forward face and extending rearward of the body. The rearward offset lug is accepted into the blade of the bit. The forward face supports the cutter and any impacts to the cutter are transmitted through the backing element rearward through the offset lug into the blade of the bit.

In another aspect of the invention, a backing element is received into an opening in the bit and the cutter is received into a pocket of the body of the bit adjacent the backing element. The back of the cutter can be bonded to the backing element and the cutter and backing element are secured to the bit. The backing element has a lug protruding into the body of the bit to better anchor the body element, and the cutter, against loss.

In another aspect of the invention, a protrusion of the backing element is formed such that it rises above the back face of the cutter. The protrusion engages the surface of the formation when the cutter engages the rock at a higher-than-optimal depth of cut. The protrusion may be offset from the radius, or track, of cutter to limit depth of penetration of the cutter.

In the various embodiments shown the cutter has a front face for contacting the rock in the borehole and displacing material. The front face is typically a hard material such as a diamond composite that can withstand severe cutting conditions with limited damage to the cutter. The body of the cutter is formed from tungsten carbide and is secured to the bit body by brazing or other method. The body of the cutter can be steel or tungsten carbide or other material with adequate strength and toughness for operational conditions.

Other aspects, advantages, and features of the invention will be described in more detail below and will be recognizable from the following detailed description of example structures in accordance with this disclosure.

DETAILED DESCRIPTION OF THE DISCLOSURE

Figure 1:
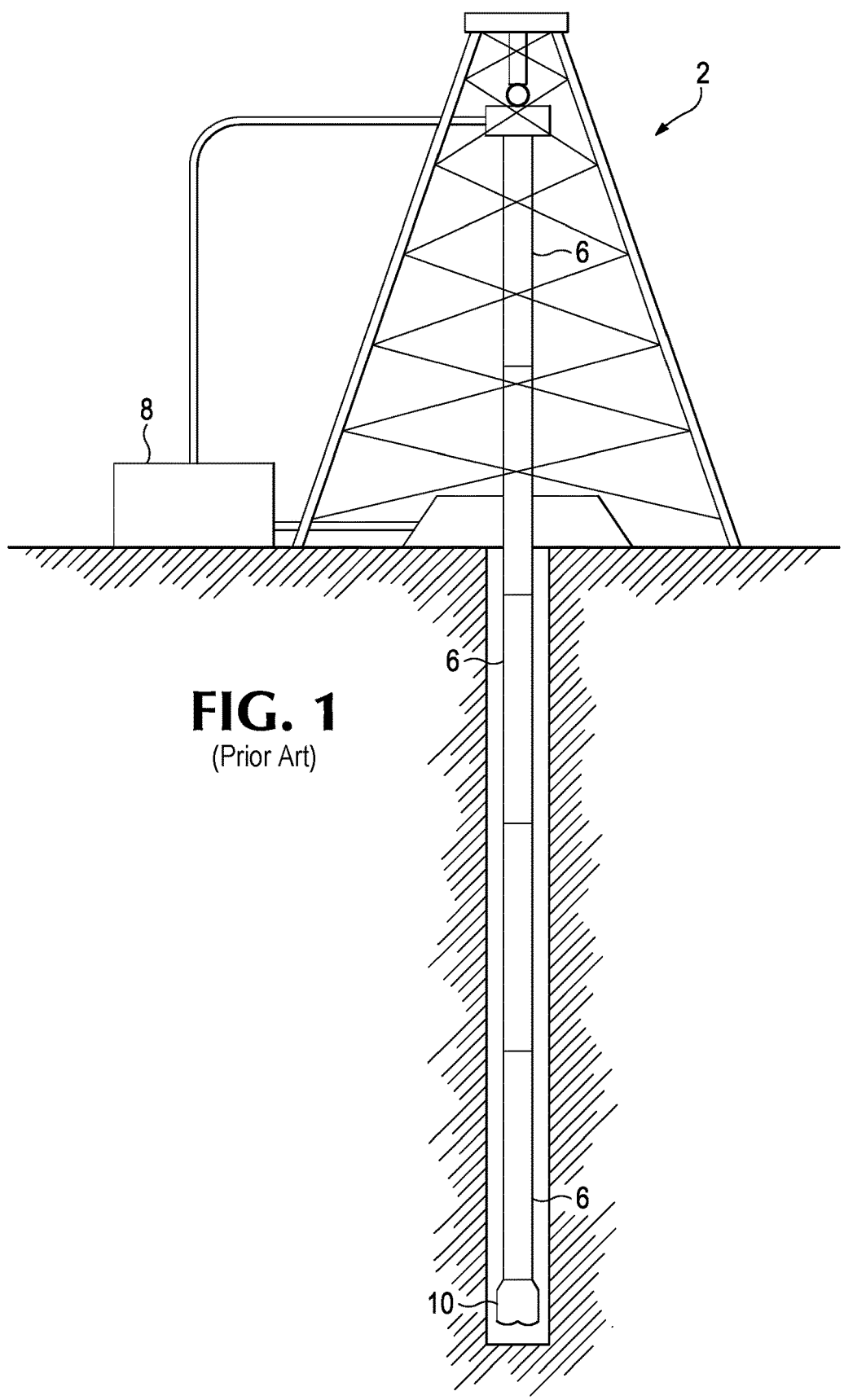
FIG. 1 is a schematic depiction of a drilling system according to an exemplary embodiment of the present invention.
Figure 2:
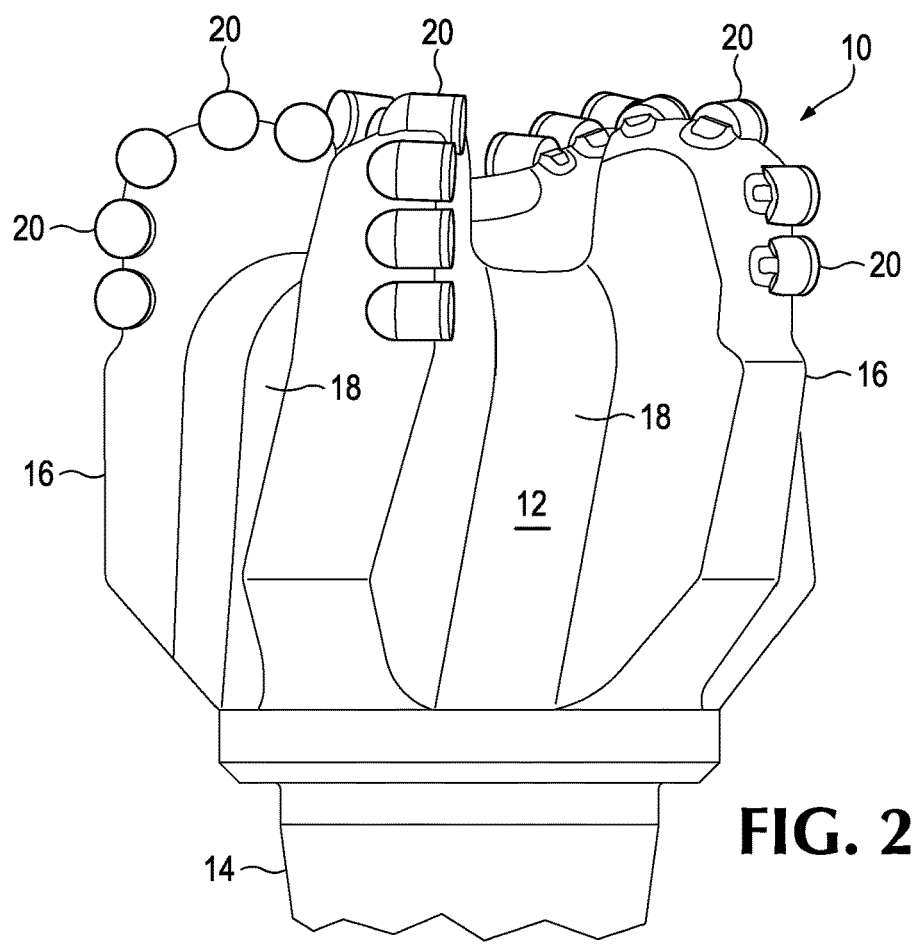
FIG. 2 is a side elevation view of a rotating bit with cutters for a drilling system.
Figure 3:
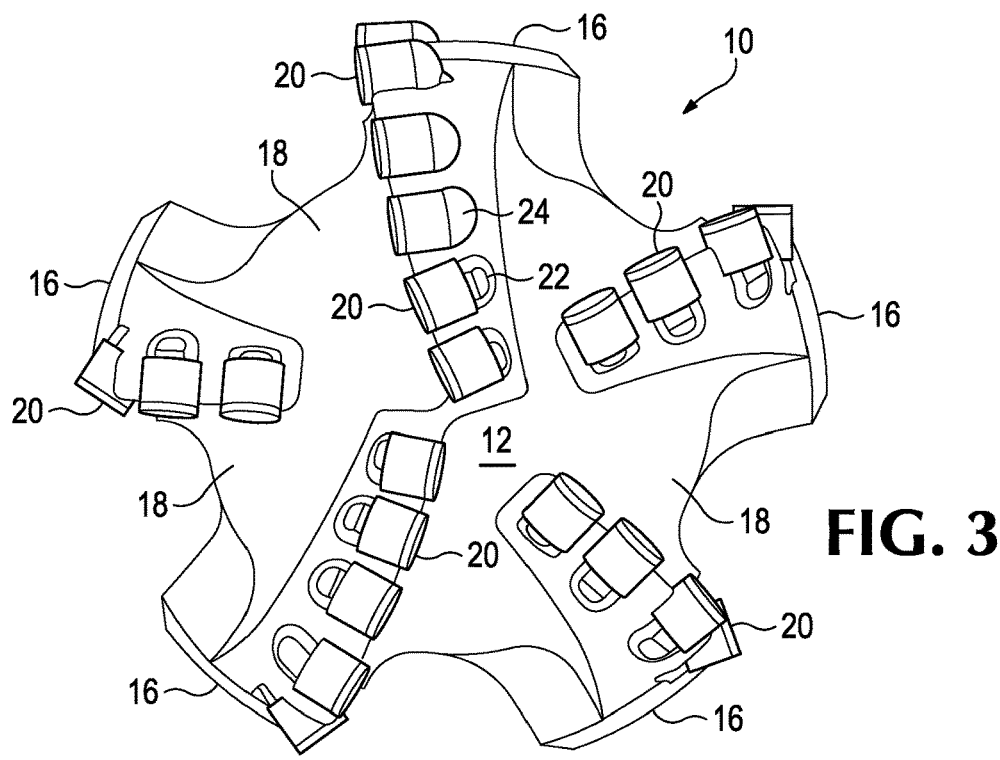
FIG. 3 is a top view of the rotating bit of FIG. 2.

Drill bits used in downhole boring operations such as for gas and oil exploration operate at extreme conditions of heat and pressure often miles underground. Failure of the bit during drilling requires the entire length of drill pipe to be retracted and disassembled so that a new bit can be run. The drill string or pipe then has to be reassembled as the bit is again run to the bottom of the borehole. This takes a significant amount of time and represents considerable added cost to the drilling operation. More robust bits requiring less maintenance allow the drilling operation to run more efficiently at a lower cost.

Bits are attached to the end of a drill string that is usually rotated, allowing the cutter to engage the rock to create the wellbore. The body supports a plurality of cutters on vanes or blades and the cutters make contact with the formation at the bottom of the wellbore. The cutters have forward faces with a hardened material such as boron nitride, tungsten carbide or diamond matrices to shear the rock at the bottom. Liquid, or drilling fluid, is pumped down the drill pipe to cool the cutters on the bit and flush the rock cuttings up the annulus of the drill pipe to the surface.

Bits, cutters, other components and features are generally represented in FIGS. 2 through 9. Drill bits 10 generally include a body 12 and a threaded pin 14 for mounting the bit to the end of a drill pipe 6. Blades or arms 16 extend upward from the body 12 supporting cutters 20 around the profile of the bit. Blades 16 define channels, or waterways, 18 between the blades. Fluid is pumped down the drill pipe and out through openings, or nozzles, on the face of the bit to flush rock cuttings in the borehole through the channels, or waterways, away from the bit and up to the surface. Other configurations can be used.

Figure 4:
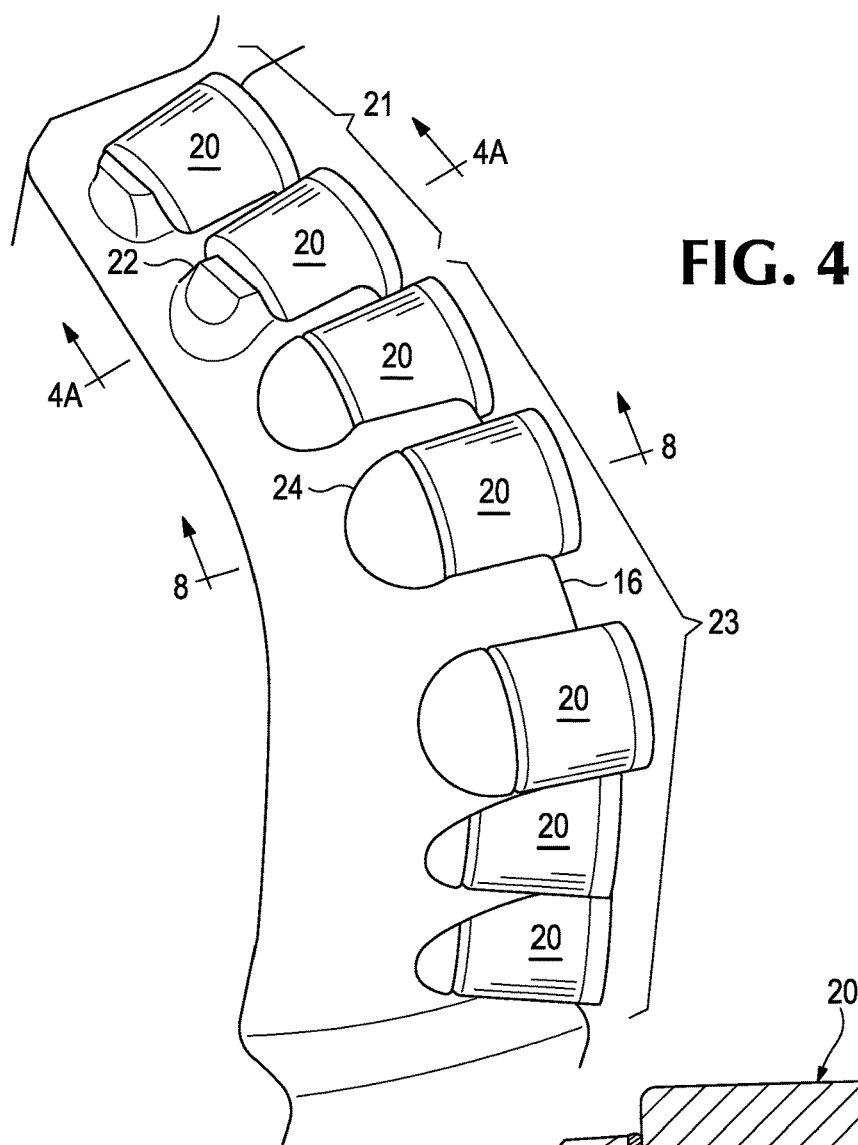
FIG. 4 is a detail view of a portion of the rotating bit of FIG. 2 showing an arm with cutters supported by conventional cutter supports and inventive backing elements.
Figure 4A:
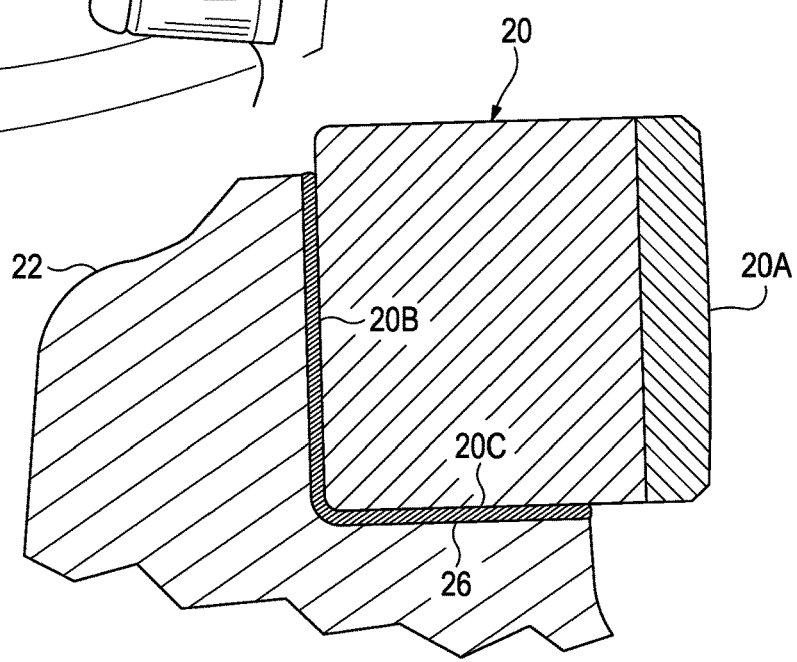
FIG. 4A is a cross section view along line 4A-4A of FIG. 4 showing construction of prior art.
Figure 5:
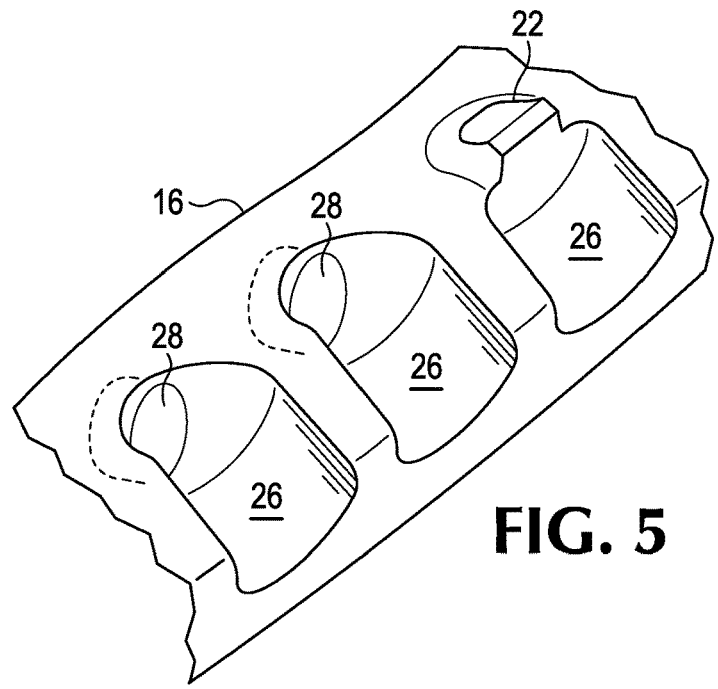
FIG. 5 is a detail view of a portion of the rotating bit of FIG. 2 showing recesses and openings for receiving inventive backing elements and cutters on an arm.
Figure 6:
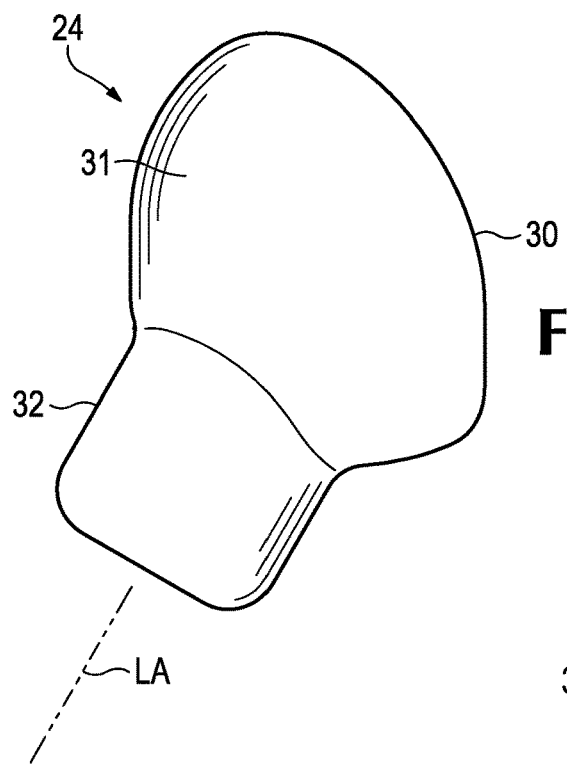
FIG. 6 is a perspective view of the back of an inventive backing element.
Figure 7:
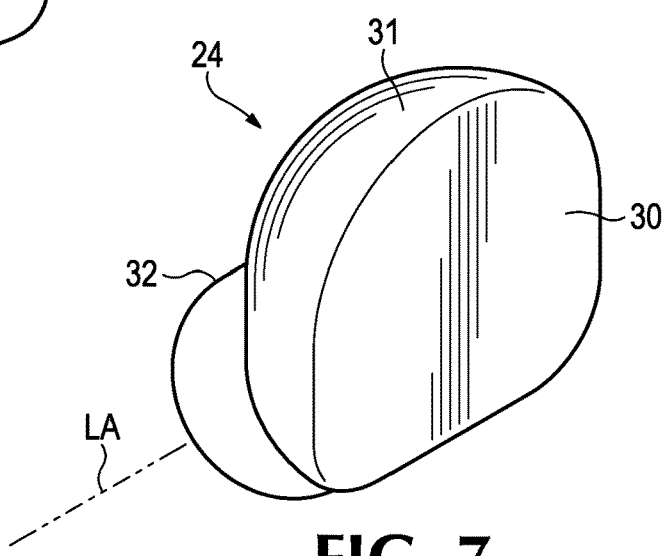
FIG. 7 is a perspective view of the front of an inventive backing element.
Figure 8:
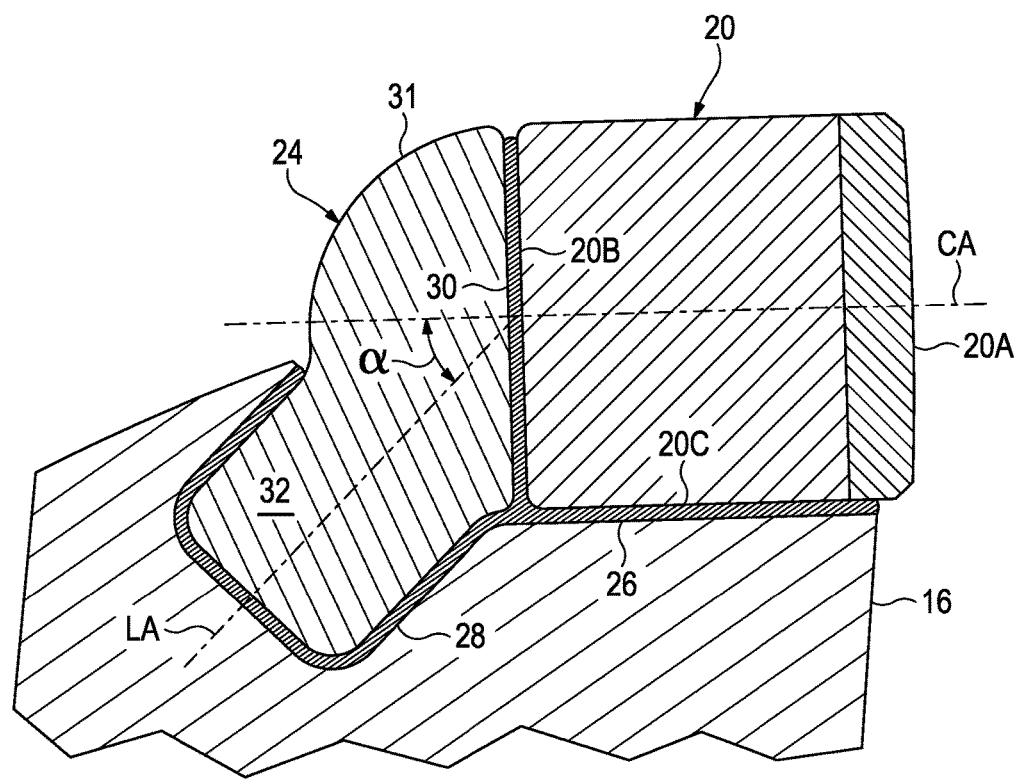
FIG. 8 is a cross section view along line 8-8 in FIG. 4 showing an inventive backing element and cutter positioned in a recess and opening.
Figure 9:
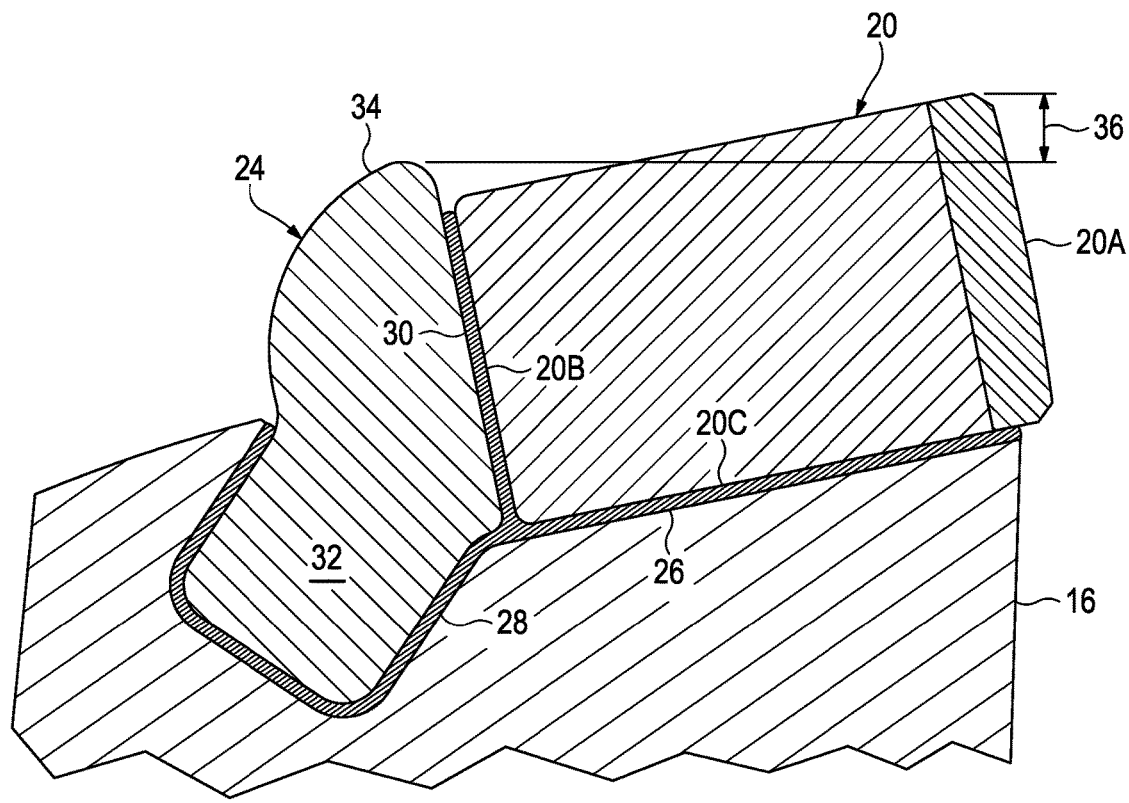
FIG. 9 is a cross section view (like FIG. 8) of an inventive backing element and cutter positioned in a recess and opening.

FIG. 4 is a perspective view of a blade 16 of bit 10 with two different kinds of raised backing support structures for cutters 20. The top set of cutters 21 include conventional raised extension features 22, extending upward from body 12 abutting the back face 20B of cutter 20. These extensions are an integral part of the body and are made of the same material as the body. The lower set of cutters 23 abut the inventive cutter backing elements 24 which are separate components from the cutters and the bit body. Both the raised integral extensions 22 and backing element 24 provide support and retention for cutters 20 on bit 10. The configuration of the blades and cutters in the figures are examples and many other configurations are possible. More or fewer blades may be used on the bit. There may be more or fewer cutters on the blades.

Recesses, seats or pockets 26 and 28 for the set of cutters 23 are formed in bit 10 for receiving cutters and support components. The forward portion of the pocket extends longitudinally generally perpendicular to the front of the blade and the pocket has a curvature in cross section that has a radius of curvature approximately equal to the radius of a cutter. The front portion of the pocket opens at the front of the blade and the cutter is generally received into the front of the pocket. The rearward portion of the pocket transitions to a configuration for receiving the body of the backing element and to a rearmost opening 28. Opening 28 is preferably a cavity or hole that extends into the body of the bit or the blade, but can be an open channel for receiving one side of the backing element lug. The axis of opening 28 is inclined to the longitudinal axis of the pocket so the opening 28 extends into the bit, generally deepening in relation to the blade top surface as it extends into the blade.

Backing element 24 includes a body 31 with a forward support face 30 and a rearward offset lug 32 spaced behind the forward face and extending rearward of the body 31. The rearward offset lug is accepted into the recess 28 in the blade of the bit. The forward face 30 supports the cutter and force on and any impacts to the cutter are transmitted through the backing element rearward through the offset lug into the blade of the bit.

Lug 32 has a longitudinal axis LA. Face 30 is generally planar and perpendicular to the central axis of the cutter 20 it supports. The lug longitudinal axis LA preferably is inclined to the cutter central axis CA so the lug is received into opening 28 in the blade and body 31 is received into the rearward portion of the recess in the bit, proximate to recess 28, to better avoid loss of the backing element. The inclination can vary depending on the location of the pocket and cutter along the blade. In a preferred embodiment, the lug longitudinal axis is inclined at an acute angle $\alpha$ in the range of 45 to 75 degrees to the central axis direction.

Cutter 20 includes a rear face 20B, a front face 20A and side 20C. Front face 20A is comprised of a hardened material such as tungsten carbide or diamond matrix. Cutter 20 on assembly into the bit is received by the forward portion of the pocket 26 in blade 16 and rear face 20B abuts face 30 of backing element 24. Lug 32 is secured in opening 28, cutter outer diameter 20C is secured to pocket 26 and rear face 20B is secured to face 30 by brazing or other means.

The transition of the loads from the front face of the backing element to lug 32 at an acute angle $\alpha$ transfers loads and operational impact forces more efficiently through the backing element to the bit body than known backing elements with bases extending perpendicular to the central axis of the cutter that concentrate the forces applied to the cutter. The lug of the inventive backing element extends from the body of the backing element into the opening of the bit at an acute angle $\alpha$ rather than a right angle to limit stress concentration.

In a preferred embodiment opening 28 extends deeper into the bit body than the pocket receiving the cutter. The openings and lugs are protected from wear by being further within the bit body, and they can therefore form a secure means by which a replacement backing element can be located and secured into the body.

Pocket 26 defines the orientation of the cutter when mounted and each cutter can have a unique orientation in relation to nearby cutters to optimize the operation of bit 10 in cutting the bore hole. Preferably, pockets contact only one side of the outer diameter of cutter 20 with the other side of the cutter from the front face 20A to the back face 20B being exposed. Alternatively, pockets completely receive the rear portion of the cutter 20 and front portions of the cutter are exposed. In each case at least a portion of the cutter's front face 20A is exposed to allow contact with the formation.

Backing element 24 provides positive support to retain the cutter in the blade of the bit. Raised extensions 22 integral with the bit body are generally made from the same material as the bit. A backing element 24 as a separate component can be a harder material such as tungsten carbide which is less subject to wear and erosion and provides additional protection for the bit from abrasion and corrosion. This is a particular advantage for steel bits, but is also a benefit in matrix bits. Use of a tungsten carbide backing element reduces the rapid wear that can occur with backing portions formed in steel bit bodies. Backing elements also withstand impact loads better than applied hardfacing and are easier to install as compared to the application of hard facing to the curved and sometimes bulbous surfaces of extension 22. In addition, welded hardmetal tends to dissolve the raised steel extensions, thus further reducing their strength.

Lug 32 is preferably round in cross section, but can be any form. Preferably backing element face 30 and cutter rear face 20B are planar, but they could be non-planar. Face 30 could be curved and rear face 20B of cutter 20 could be similarly curved so the cutter can meet the backing element over a range of angles and still provide significant support. Face 30 can have other non-planar shapes with corresponding shapes for the rear face of the cutter. Alternatively, the shape of face 30 may not correspond to the rear face 20B of the cutter.

Element 24 can also act as a load limiter to limit engagement depth, or the depth-of-cut, of the associated cutter. In normal operation only a portion of the cutter face 20A engages the formation in the wellbore. Engaging a larger portion of the cutter face creates large forces and torque at the drill bit, slowing rotation. The binding force can cause the bit to stop rotating or stick in the wellbore, with the drill pipe continuing to wind up from the rig at surface. When sufficient torque is built up through rotation of the drill string, the bit starts to rotate again, or slips, unwinding at high speed as the torsional energy in the drill string is released. This is referred to as stick-slip and can damage drilling equipment and dramatically limit efficiency of operation. Stick-slip can also put excess stress on the cutters which can damage them or cause them to be lost from the bit.

In this alternative embodiment, protrusion 34 of element 24 can extend away from the blade top surface and above the back face 20B of the cutter. Protrusion 34 engages the surface of the wellbore when the cutter engages the bore beyond an optimum depth 36. The recess and cutter may be oriented in the blade with significant side rake so that protrusion 34 is offset from the track of cutter 20 along the borewall to limit depth of penetration of the cutter. Where protrusion 34 is positioned directly behind the cutter with limited side rake, the protrusion is in the furrow or groove cut by the cutter and does not contact the borewall. Protrusion 34 can be rounded to minimize the friction on contacting the bore face while limiting how much further the cutter can engage the rock formation. This in turn limits friction and the occurrence of stick-slip events during operation. Protrusion 34 can include a PCD table, a hard coating or other feature to limit wear.

While backing elements with protrusions 34 preferably have lugs 28 at an acute angle $\alpha$ to the central axis of the cutter, such protrusions could be provided on backing elements secured in known ways such as having no lug on a base that is perpendicular to the cutter longitudinal axis.

It should be appreciated that although selected embodiments of the representative cutter backing elements are disclosed herein, numerous variations of these embodiments may be envisioned by one of ordinary skill that do not deviate from the scope of the present disclosure. This presently disclosed invention lends itself to use for both steel and tungsten carbide matrix bits.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

The invention claimed is:

1. A backing element for a PDC cutter having a diamond table mounted to a substrate to be installed to a drill bit with a blade including:
   a body with a forward face and a first longitudinal axis normal to the forward face adapted for supporting a rear end of a separate cutter element comprising a PDC cutting portion affixed to a substrate portion; and
   a lug offset from the first longitudinal axis extending rearward from the body for acceptance in a recess of the blade, the lug having a second longitudinal axis extending downwardly from the first longitudinal axis, but not perpendicular to it;
   where force applied to a front end of the cutter element is transferred through the forward face of the backing element rearward through the offset lug into the blade of the bit;
   wherein at least a portion of an exterior surface of the body is convex along the first longitudinal axis.

2. The backing element of claim 1 wherein the second longitudinal axis is inclined to the first longitudinal axis at an inclusive angle between 45 to 75 degrees.

3. The backing element of claim 1 where the offset lug is brazed in the blade of the bit.

4. The backing element of claim 1 where the forward face of the body is brazed to the back face of the cutter element.

5. The backing element of claim 1 where the lug is round in cross section.

6. The backing element of claim 1 where the backing element is steel.

7. The backing element of claim 1 where the backing element is metal carbide.

8. A method of supporting a cutter on a drill bit comprising:
   receiving a backing element including an offset lug in a first recess in the bit, wherein the offset lug is a portion of the backing element and wherein the backing element is also at least partially received in a second recess of the bit;
   receiving the cutter in the second recess of the bit adjacent the backing element;
   bonding a front face of the backing element to a back face of the received cutter; and
   bonding the backing element to the first and second recesses of the bit;
   where the cutter has a longitudinal axis and the lug has a longitudinal axis and the cutter axis is offset from the lug axis at an inclusive angle between 45 to 75 degrees.

9. The method of claim 8 comprising brazing the backing element in the first recess.

10. The method of claim 8 comprising brazing the cutter in the second recess.

11. The method of claim 8 comprising brazing the front face of the backing element to the back face of the cutter.

12. A drill bit comprising:
    a drill bit body with blades;
    a cutter with a rear face;
    a cutter support with a front face and an offset lug extending rearward spaced from the front face, wherein the offset lug is a portion of the cutter support;
    a recess in the bit for receiving the lug; and
    a seat in the bit for receiving the cutter;
    where the front face of the cutter support abuts the rear face of the cutter substrate with the lug received in the recess, the cutter support at least partially received in the seat in the bit, and the cutter received in the seat.

13. The drill bit of claim 12 where the cutter support front face is brazed to the cutter rear face.

14. The drill bit of claim 12 where the cutter support lug is brazed in the recess of the bit.

15. The drill bit of claim 12 where the cutter is brazed to the seat of the bit.

16. The drill bit of claim 12 where the lug is offset 45 to 75 degrees from a longitudinal axis of the cutter support normal to the front face.

17. A drill bit comprising:
    a drill bit body with blades;
    a cutter with a rear face;
    a cutter support with a front face and an offset lug extending rearward spaced from the front face;
    a recess in the bit for receiving the lug; and
    a seat in the bit for receiving the cutter;
    where the front face of the cutter support abuts the rear face of the cutter substrate with the lug received in the recess and the cutter received in the seat; and
    where the cutter support extends above the cutter rear face to engage the rock face and limit the depth of engagement by the cutter.

18. The drill bit of claim 12 where the cutter rear face conforms to the surface of the cutter support front face.

19. A drill bit comprising:
    a bit body with blades;
    a cutter secured to the bit body, the cutter having a front face and a rear face;
    a cutter support in contact with the cutter with a rearward extending lug offset from the rear face towards the bit body and secured to the bit body;
    wherein the cutter support extends outward of the rear face of the cutter to limit depth or penetration of the cutter.

20. A drill bit tooth comprising:
    a backing element; and
    a cutter element;
    wherein the backing element has
       a body with a forward face and a first longitudinal axis normal to the forward face adapted for supporting the rear end of the cutter element, and
       a lug offset from the first longitudinal axis extending reward from the body for acceptance in a recess of a blade, the lug having a second longitudinal axis extending downwardly from the first longitudinal axis, but not perpendicular to it;
    wherein the cutter element comprises a cutter portion affixed to a substrate portion formed of a different material from the cutter, the cutter portion being the forward face of the cutter element and the substrate portion being the rear end of the cutter element;

wherein the body includes an enlarged cross-sectional area as compared to a cross-sectional area of the lug; and wherein the backing element and the cutter element are preformed separately.

21. The tooth of claim 20 wherein the second longitudinal axis is inclined to the first longitudinal axis at an inclusive angle between 45 to 75 degrees.

22. The tooth of claim 20 wherein the offset lug is brazed in the blade of the bit.

23. The tooth of claim 20 wherein the forward face of the body is brazed to the back face of the cutter element.

24. The tooth of claim 20 wherein the lug is round in cross section.

25. The tooth of claim 20 wherein the backing element is steel.

26. The tooth of claim 20 wherein the backing element is metal carbide.

* * * * *